F. GLATZ.
FIFTH WHEEL DEVICE FOR AUTOMOBILES.
APPLICATION FILED AUG. 24, 1917.
1,255,155.
Patented Feb. 5, 1918.
2 SHEETS—SHEET 1.
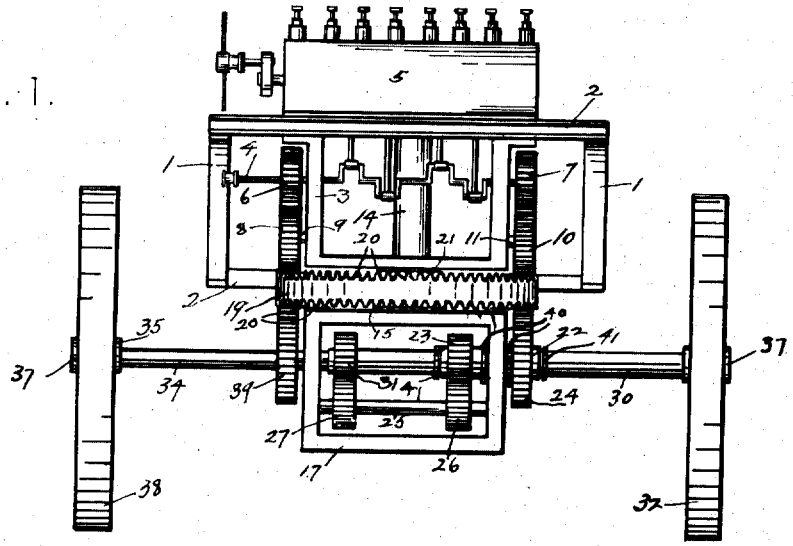
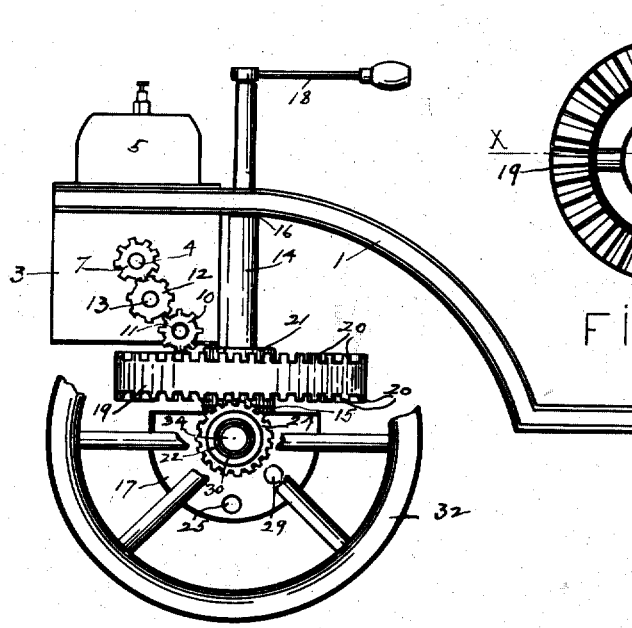
WITNESS:
Marion Tiffany
F. E. Small
INVENTOR.
FRANK GLATZ
BY M. C. Gillham
ATTORNEY.

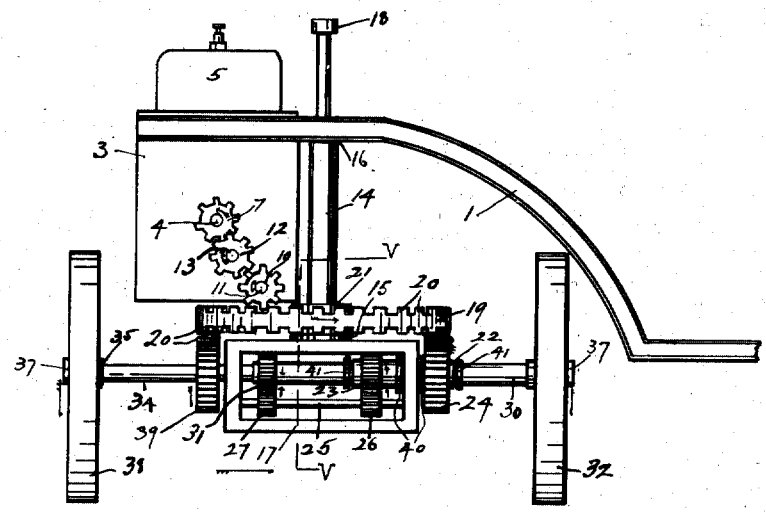
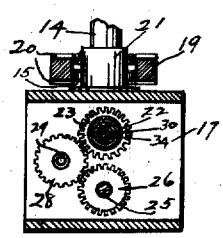
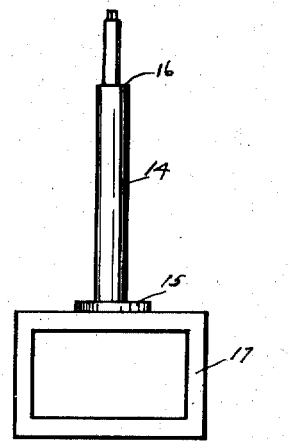
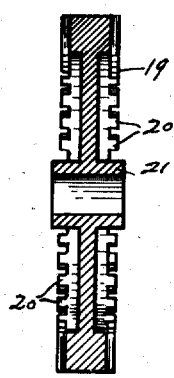
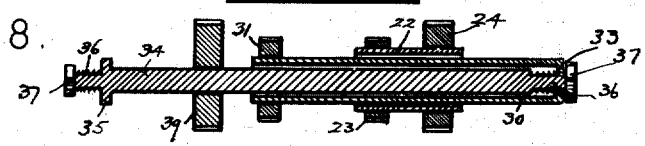
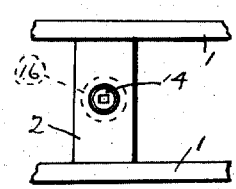

UNITED STATES PATENT OFFICE.

FRANK GLATZ, OF KANSAS CITY, MISSOURI.

FIFTH-WHEEL DRIVE FOR AUTOMOBILES.

1,255,155.   Specification of Letters Patent.   Patented Feb. 5, 1918.

Application filed August 24, 1917. Serial No. 187,957.

*To all whom it may concern:*

Be it known that I, FRANK GLATZ, a citizen of the United States, residing at Kansas City, in the county of Jackson and State of Missouri, have invented a new and useful Fifth-Wheel Drive for Automobiles, of which the following is a specification.

My invention relates to fifth-wheel drives for automobiles in which the fifth-wheel operates in conjunction with power receiving and power imparting devices to drive the front wheels; and the objects of my invention are, first, to provide a power receiving and power imparting fifth-wheel; second, to provide a turn-post upon which the fifth-wheel shall revolve; third, to provide a supporting frame integral with the lower end of the turn-post to receive the shafts on which the front traction wheels are mounted; fourth, to provide individual shafts for the front traction wheels with power receiving and power imparting devices acted upon by the fifth-wheel to simultaneously drive the individual axles or shafts; and, fifth, to provide a plurality of power receiving and power imparting devices to drive the fifth-wheel.

I attain these and other objects and advantages by means of the mechanism illustrated in the accompanying drawing in which—Figure 1, is a front elevation of an automobile to which my invention is operatively applied; Fig. 2, is a side elevation of the same, and showing the turn-post with means for steering the front wheels to cut under the chassis; Fig. 3, is a plan view of the fifth-wheel; Fig. 4, is a side elevation of the front portion of the automobile, and showing the traction wheels steered under the chassis; Fig. 5, is a sectional view of the inner side of the supporting frame on the turn-post on the line X—X in Fig. 2; Fig. 6, is an elevation of the turn-post, and showing the supporting frame thereon; Fig. 7, is a cross section through the fifth-wheel on the line X—X in Fig. 8, and showing the upper and lower sides thereof; Fig. 8, is a vertical section through the shaft, and showing the power receiving and power imparting devices thereon, in cross section; and, Fig. 9, is a top plan view of a fragment of the chassis, and showing the method of supporting the same by means of a shoulder on the turn-post.

Similar reference numerals refer to corresponding parts throughout the several views.

The side members 1, and the cross ties or plates 2, comprise a fragmentary portion of the front portion of an automobile chassis or frame. The side members are curved upwardly and forwardly to bring the forward portions to lie horizontally in a plane above the plane of the chassis proper. The curvature of the side members being of a radius suitable to permit the front traction wheels to cut under the chassis in the steering of the automobile. A supporting frame 3, is attached to the lower side of the front end of the chassis. A crank shaft 4, of a motor 5, is journaled in the upper portion of the sides of the supporting frame. Driving gear wheels 6 and 7, are mounted on the crank shaft at opposite sides of the frame. A gear wheel 8, is mounted idly on a stub shaft 9, which is fixed in the adjacent side of the frame, so that the gear wheel will be engaged by the driving gear wheel 6. A gear wheel 10, is mounted idly on a stub shaft 11, which is fixed in the opposite side of the frame, closely adjacent the driving gear wheel 7, but not engaged thereby. A gear wheel 12, is mounted idly on a stub shaft 13, which is fixed in the side of the frame, at a point which will permit the gear wheel 12 to be engaged by the driving gear wheel 7, and to engage the gear wheel 10. A turn-post 14, is provided, integrally with a horizontally disposed wheel hereinafter described. The turn-post is also provided with a broad shoulder 15, located adjacent the top, and which is adapted to receive, support, and slidably engage the cross ties of the chassis to hold the latter in proper position. A supporting frame is formed integrally with the lower end portion of the turn-post 14, to receive and support power receiving and power transmitting devices hereinafter described. A steering lever 18, is mounted on the upper end of the turn-post to facilitate the steering and guiding of the automobile. A horizontally disposed fifth-wheel 19, is mounted idly on the turn-post, so that its hub 21, shall bear upon the shoulder 15, and slide thereon when the fifth-wheel revolves. The fifth-wheel is provided on its upper and lower sides with radially extending cogs 20, the upper cogs being engaged by the gear wheels 8 and 10, whereby the fifth-wheel is driven by the driving gear wheels 6 and 7. A horizontally disposed tubular shaft 22, is journaled in the upper portion of one side of the frame 17, and is provided within the frame with a gear wheel 23, and outwardly of the frame with a gear wheel 24, the latter being engaged and driven by the lower cogs on the fifth-wheel. A horizontally disposed shaft 25, is journaled in the frame 17, below adjacent the tubular shaft 22, and is provided within the frame with a gear wheel 26, and with a gear wheel 27. A gear wheel 28, is mounted idly on a stub shaft 29, which is fixed in the side of the frame 17, at a point that will permit the gear wheel 28, to be engaged by the gear wheel 23, and to engage the gear wheel 26. A tubular shaft 30, is revolubly mounted in the tubular shaft 22, and is provided within the frame 17, with a gear wheel 31, which is engaged by the gear wheel 27, and outwardly of the frame with a traction wheel 32, the latter being adapted to revolve therewith. The outer end of the tubular shaft 30, is provided with an inwardly extending annular flange 33, for a purpose that will presently appear. A shaft 34, is revolubly mounted in the tubular, shaft 30, and journaled in the one side of the frame 17, and is provided with an outwardly extending flange 35, to hold a traction wheel on the end of the shaft in place, and also provided with reduced end portions 36, provided with external screw threads adapted to receive clamping nuts 37, to hold the traction wheels in place. A traction wheel 38, is mounted on the projecting end portion of the shaft 34, outwardly of the flange 35. A gear wheel 39, is mounted on the shaft 34, adjacent the frame 17, so that the cogs on the lower side of the fifth-wheel shall engage and drive the same. Collars 40, are adjusted on the tubular shaft 22, to hold the latter in place. Collars 41, are adjustably mounted on the tubular shaft 30, to hold the latter in place.

The mechanism herein-above described, operates substantially in the following manner:—The motor 5, drives the crank shaft 4, in the well known manner of internal combustion motors. In this instance the motor is positioned transversely of the chassis, so that the crank shaft may be utilized to drive a plurality of driving gear wheels.

The crank shaft revolves the driving gear wheels 6 and 7, in this instance, in the direction of the arrows shown in Fig. 4, the driving gear wheels respectively driving the gear wheels 8 and 12, the latter driving the gear wheel 10. The gear wheels 8 and 10, drive the fifth-wheel 19, in a common direction, although the gear wheels 8 and 10, are driven in opposite directions. The fifth-wheel revolving in the direction of the arrow marked thereon, in Fig. 4, drives the gear wheel 39, forwardly and the gear wheel 24, rearwardly, the forward drive of the gear wheel 39, carries the shaft 34, and the traction wheel 38, in the same direction, the rearward drive of the gear wheel 24, revolves the tubular shaft 22, and the gear wheel 23, thereon in the same direction, and the gear wheel 23, drives the gear wheel 28, forwardly, and the latter drives the gear wheels 26 and 27, and shaft 25, rearwardly, and the gear wheel 27, drives the gear wheel 31, the tubular shaft 30, and the traction wheel 32, in forward direction, the movement of the latter corresponding with the movement of the traction wheel 38. It is obvious that if the direction of the driving gear wheels be reversed, the traction wheels would be forced to roll in the reverse direction. If it is desired to steer or guide the automobile, a pulling or pushing pressure is applied to the lever 18. In Fig. 4, I show the front traction wheels of the automobile steered so that the inner wheel of the front wheels is cut under the chassis. The methodical arrangement of the power receiving and power transmitting devices, in conjunction with the horizontally disposed fifth-wheel, provides a front wheel drive and efficient means for steering and guiding the automobile, at the same time, and in narrow and constricted limits.

Having described my invention what I claim is—

A fifth-wheel drive for automobiles, consisting of a turn-post provided with a supporting frame on its lower end, a chassis supportingly engaged by said turn-post, a plurality of driving gear wheels mounted on said chassis, a fifth wheel mounted idly on said turn-post and provided with cogs on its upper and lower sides, power receiving and power transmitting devices mounted on the chassis and connected between the upper side of said fifth wheel and said driving gear wheels, a tubular shaft revolubly mounted on the frame on said turn-post and provided with a gear wheel in engagement with the lower side of said fifth-wheel, a revolubly mounted tubular shaft floating in said first mentioned tubular shaft and provided on its outer end with a traction wheel, a revolubly mounted shaft floating in said last mentioned tubular shaft and provided on its outer end with a traction wheel and with a gear wheel in engagement with the lower side of said fifth-wheel, power receiving and power transmitting devices connected between said tubular shafts and operable by the gear wheel on said first mentioned tubular shaft to differentiate the motion of the shafts, and means for driving said driving gear wheels.

FRANK GLATZ.

Witnesses:
J. MORGAN MARMADUKE,
MARION TIFFANY.

Copies of this patent may be obtained for five cents each, by addressing the "Commissioner of Patents, Washington, D. C."